(12) United States Patent
Lanter (10) Patent No.: US 10,039,301 B1
(45) Date of Patent: Aug. 7, 2018

(54) METHODS AND SYSTEMS FOR PRODUCING FEED PRODUCTS HAVING DIFFERENT PARTICLE DENSITIES USING A SINGLE EXTRUSION PROCESS

(71) Applicant: PURINA ANIMAL NUTRITION LLC, Shoreview, MN (US)

(72) Inventor: Kent J. Lanter, Waterloo, IL (US)

(73) Assignee: PURINA ANIMAL NUTRITION LLC, Shoreview, MN (US)

( * ) Notice: Subject to any disclaimer, the term of this patent is extended or adjusted under 35 U.S.C. 154(b) by 29 days.

(21) Appl. No.: 15/406,560

(22) Filed: Jan. 13, 2017

(51) Int. Cl.
*A23K 40/25* (2016.01)
*B29C 47/30* (2006.01)
*B01J 2/20* (2006.01)
*B29C 47/00* (2006.01)

(52) U.S. Cl.
CPC .............. *A23K 40/25* (2016.05); *B01J 2/20* (2013.01); *B29C 47/0011* (2013.01); *B29C 47/30* (2013.01)

(58) Field of Classification Search
None
See application file for complete search history.

(56) References Cited

U.S. PATENT DOCUMENTS

| | | | | |
|---|---|---|---|---|
| 4,393,087 A | * | 7/1983 | Sullins | A23K 40/20 426/74 |
| 2012/0207907 A1 | * | 8/2012 | Lanter | A23K 40/25 426/576 |
| 2015/0149125 A1 | * | 5/2015 | Meidhof | B29B 9/065 703/1 |

OTHER PUBLICATIONS

Purina® AquaMax® Sport Fish MVP Product Description, downloaded from https://www.purinamills.com/fish-and-aquatics-feed/products/detail/purina-aquamax-sport-fish-mvp, accessed Apr. 13, 2017, 4 pages.

* cited by examiner

*Primary Examiner* — Mary Lynn F Theisen
(74) *Attorney, Agent, or Firm* — Dorsey & Whitney LLP (57) ABSTRACT

Methods of simultaneously forming feed particles of different densities involves extruding a heated feed through an extruder having an extruder die defining a plurality of die openings. A first plurality of the die openings comprises a land length that is at least two times as long compared to a diameter of a respective die opening. A second plurality of the die openings comprises a land length that is equal to or less than a diameter of a respective die opening. Extrusion through the first plurality of the die forms extruded ribbons with a first density, while extrusion through the second plurality of the die openings forms extruded ribbons with a second density that is lower than the first density. The method proceeds by cutting the first and second plurality of extruded ribbons to simultaneously form feed particles of the first and second densities.

17 Claims, 4 Drawing Sheets

METHODS AND SYSTEMS FOR PRODUCING FEED PRODUCTS HAVING DIFFERENT PARTICLE DENSITIES USING A SINGLE EXTRUSION PROCESS

TECHNICAL FIELD

This disclosure relates to methods for producing animal feed products having different particle densities, and more particularly, methods for producing such products using a single extrusion process.

BACKGROUND

The size and/or density of aquatic feed particles may vary depending on the fish to be fed the feed particles. For example, larger fish may consume feed particles having larger diameters than smaller fish. The location of the aquatic feed particles within the aquatic habitat of the fish may also impact the type of fish targeted by the feed particles. Bottom-feeding fish, for instance, may consume aquatic feed particles that sink to the bottom of the water, while surface feeders may consume feed particles floating at or near the surface of the water. As a result, aquatic feed particles of diverse size and density may be required to feed fish having different feeding styles and capabilities.

Methods of producing aquatic feed particles may involve creating an aquatic feed mixture and extruding the mixture through an extruder die. Preexisting methods of aquatic feed particle extrusion produce aquatic feed particles having only a single, uniform particle density, such that all aquatic feed particles produced in an extrusion process yield aquatic feed particles adapted either to float or to sink. To produce aquatic feed products comprised of aquatic feed particles having multiple densities, thus targeting multiple types of fish, the feed particles of multiple extrusion operations must be combined. Depending on the variety of fish targeted by a single aquatic feed product, many extrusion operations may be required. The multiplicity of extrusion processes, and the steps required to combine the differently-configured feed particles produced from such processes may be cumbersome and inefficient, and may necessitate specialized machinery simply to facilitate the required feed particle combination.

SUMMARY

The implementations of the present disclosure overcome these shortcomings by providing methods for producing aquatic feed products having different particle densities using a single extrusion process, and more particularly, using a single extruder die adapted to simultaneously produce multiple extrusions of aquatic feed mixtures at different densities.

Some implementations provide a method of simultaneously forming feed particles of different densities involving extruding a heated feed composition comprising at least about 10 wt % starch through an extruder having an extruder die, the extruder die comprising a plurality of spaced pocket regions, each pocket region defining a plurality of die openings. Each of a first portion of the die openings may include a land length that is at least two times as long as a diameter of a respective die opening. Each of a portion of a second plurality of the die openings may include a land length that is equal to or less than a diameter of a respective die opening. Extrusion of the heated feed composition through the first plurality of the die openings results in compressing the heated feed composition along a longer land length compared to the heated feed composition in the second plurality of the die openings thereby causing a first plurality of extruded ribbons to exit the extruder die with a first density. Extrusion of the heated feed composition through the second plurality of the die openings results in compressing the heated feed composition along a shorter land length relative to the feed composition in the first plurality of the die openings thereby causing a second plurality of extruded ribbons to exit the second plurality of the die openings with a second density that is lower than the first density. The method further involving cutting the first and second plurality of extruded ribbons to simultaneously form feed particles of the first and second densities.

Other implementations of simultaneously forming feed particles of different densities involve extruding a heated feed composition through an extruder having a screw within a barrel, the extruder comprising an extruder die defining a plurality of die openings through which the feed composition is extruded simultaneously. A first portion of the die openings may each include a land length that is at least two times as long compared to a diameter of a respective die opening, and a second portion of the die openings may each comprise a land length that is equal to or less than a diameter of a respective die opening. Extrusion may proceed as in the above implementation, and a first plurality of extruded ribbons exiting the first plurality of the die openings may include a first density, and second plurality of extruded ribbons to exit the second plurality of the die openings with a second density that is lower than the first density.

According to various implementations and alternatives, die openings are arranged around a circumference of the pocket region and are spaced apart from one another by an equal distance as measured from an outermost edge of the die opening relative to an outermost edge of a next adjacent die opening.

According to various implementations and alternatives, a diameter of the die openings of at least a portion of the first and second plurality of the die openings are equal to each other, where an extruded ribbon with the first density is narrower relative to an extruded ribbon with the second density such that two different sized pellets are produced from die openings of the same diameter.

According to various implementations and alternatives, each pocket region defines the same number of die openings as other pocket regions.

According to various implementations and alternatives, the feed particles have a diameter of about 0.2 in. to about 2.0 in.

According to various implementations and alternatives, a diameter of the die openings of at least a portion of the first and second plurality of the die openings are equal to each other. In some examples, the equal diameters are about 0.130 in. to about 0.152 in. In such examples, a land length of the first plurality of openings is about 0.3 in. to about 0.5 in.

According to various implementations and alternatives, the extruder die comprises a plurality of spaced pocket regions, the plurality of die openings defined by the pocket regions, wherein at least one pocket region defines a portion of the first plurality of the die openings, and wherein at least one pocket region defines a portion of the second plurality of openings and is free of the first plurality of openings. In some examples, the at least one pocket region defining the portion of the first plurality of the die openings is free of the second plurality of openings. In addition or alternatively, each pocket region defines the same number of die openings as other pocket regions. In addition or alternatively, the die openings are arranged spaced apart from one another by an equal distance as measured from an outermost edge of the die opening relative to an outermost edge of a next adjacent die opening.

In various implementations or alternatives, the plurality of extruded ribbons includes about 20 to about 30 wt % moisture, the method further involves the step of drying the feed particles to a moisture content of about 8 to about 11 wt %. In addition or alternatively, the heated feed composition is a homogenous, particulated mixture. In such implementations and alternatives, the homogenous mixture is an aquatic feed composition. In addition or alternatively, the homogenous mixture includes about 20 to about 30 wt % moisture and at least 10 wt % starch.

DETAILED DESCRIPTION

Implementations provide aquatic feed products comprised of feed particles having two or more different particle densities, methods for producing such aquatic feeds using a single extrusion process, and an extruder die for producing these aquatic feeds. When the aquatic feed products are poured into water, the particle densities of the particles results in one type of particle sinking down into the water and the other type of particle floating. Particles that float may float at the water surface or may remain suspended in water for an extended period of time, such as a time period of at least 5 minutes and between about 5 minutes to about 10 minutes or longer. In some embodiments, at least a portion of the particles configured to float may float for one or more days. In embodiments, about 90% or more of the feed particles configured to float may float for at least 10 minutes. Such floating feed particles may be collectively referred to as "full-floating feed."

In prior approaches, aquatic feed products exhibited a single product density, resulting in the feed either sinking or floating depending on the feeding habits of the targeted fish to be fed (e.g., bottom-feeders or water surface feeders). Where a variety of fish with different feeding habits were to be fed, the producer may obtain different aquatic feed products each with their respective product density, and mix the products in order to simultaneously provide both sinking and floating feed.

Aquatic feed products having different particle densities:

In contrast to prior approaches, the disclosed aquatic feed products include particles of different particle densities while having the same nutritional profile. Aquatic feed particles having a first density may be adapted to float in water, while aquatic feed particles having a second density higher than the first density may be adapted to sink in water. For instance, particles having a first density may be up to 35 lbs./bushel or up to about 32 to 35 lbs./bushel (e.g., 10 to 32 or 35 lbs./bushel) may be adapted to float in water, while aquatic feed particles having a second density higher than the first density of about 35 lbs./bushel or above, or above about 32 to 35 lbs./bushel (e.g., 32 or 35 to 70 lbs./bushel) with a higher density than the first density, may be adapted to sink in water. The density required for the particle to float or sink may differ depending on the composition of the feed particle and the composition's ability to maintain sealed air pockets when exposed to water. Consequently, in other examples, feed particles adapted to float may have higher densities than those listed above, while feed particles may be adapted to sink despite having lower densities than those listed above. For instance, feed particles adapted to float may have densities above 35 lbs./bushel, ranging up to 40 lbs./bushel in some embodiments, while feed particles adapted to sink may have densities less than 35 lbs./bushel, dropping down to about 30 lbs./bushel in some examples. The aforementioned densities may represent the dry densities of the extruded feed particles. In embodiments, the various densities of the extruded feed particles may be approximately the same both before and after drying, such that the wet and dry densities of particular feed particles are approximately equal. In some examples, there may be variation in density levels between wet and dry feed particles, e.g., +/−1% to about 3%. For instance, feed particles having a wet density of about 33 lbs./bushel may have a corresponding dry density of about 32 lbs./bushel.

The pellets of the aquatic feed have a plurality of sizes. For instance, the feed may include particles of at least two different diameters or at least two different lengths. For example, particles with a density adapted to float in water may have a diameter of up to about 0.35 in. and particles with a density adapted to sink in water may have a diameter of up to about 0.175 in. In some embodiments, the feed particles may have larger diameters, e.g., between about 0.75 and about 1 in. In another example, the aquatic feed may include pellets of two or more different diameters that are adapted to sink in water each by having a length of at least about 0.5 in. In various implementations, the aquatic feed may include pellets of two or more different diameters that are adapted to float in water by having a length that is approximately the same as a diameter of the pellet. For instance, the pellets adapted to float may have a diameter of about 0.327 in. and a length of about 0.218 in. In various examples, feed particles adapted to float may have a diameter ranging from about 0.130 to about 2.0 in., about 0.175 to about 1.5 in., about 0.20 to about 1.0 in., about 0.25 to about 0.50 in., about 0.25 to about 0.35 in. or about 0.28 to about 0.32 in. In embodiments, feed particles that are smaller in size may be configured to sink, while larger feed particles may be configured to float due to the greater density levels of the smaller feed particles relative to the larger feed particles. Feed particles adapted to sink may have diameters ranging from about 0.05 to about 2.0 in., about 0.1 to about 1.5 in., about 0.13 to about 1.3 in., about 0.19 to about 1.2 in., about 0.20 to about 1.0 in., about 0.22 to about 0.50 in., about 0.25 to about 0.35 in., about 0.28 to about 0.32 in., about 0.13 to about 0.18 in., about 0.15 to about 0.18 in., or about 0.18 to about 0.22 in. By sinking to the bottom of a volume of water, such smaller feed particles may be consumed by smaller fish that typically feed at greater depths than larger fish, which may strike feed near the water surface. Feed particles adapted to sink may also differ in appearance from the feed particles adapted to float. Specifically, the sinking particles may have a visibly more tightly packed granular texture, in some cases creating a darker color of the sinking feed as well.

The aquatic feed may include a nutritional profile of fat, protein, starch, fiber, vitamins and minerals beneficial for fish, and such nutrients may be contained in a variety of aquatic feed components. The level of the nutrients provided are on an "as-is" basis, which is the typical level of each nutrient when entering the extruder. An "as-is" basis takes into account the moisture inherently in the nutrient mixture as it enters the extruder, which is typically about 8 to 13 wt % of the mixture on an as-is basis.

Some non-exhaustive examples of suitable fat sources may include but are not limited to animal fats and oils and vegetable fats and oils. Animal fats and oils may include fish oil. Fat may account for about 5 to about 20 wt % or about 11 wt % of the aquatic feed on an as-is basis. In particular examples, the fat content may range from about 6 to about 18 wt %, about 7 to about 16 wt %, about 8 to about 14 wt %, or about 10 to about 12 wt % of the aquatic feed on an as-is basis.

Protein sources in the aquatic feed may include but are not limited to animal and vegetable proteins. Some non-exhaustive examples of suitable animal protein sources include fish meal, poultry meal, meat meal, blood meal and combinations. Some non-exhaustive examples of suitable vegetable protein sources include oilseeds, grains, and legumes. An exemplary oilseed source includes soybean meal. Protein may account for about 30 to about 50 wt % or about 45 wt % of the aquatic feed on an as-is basis. In specific embodiments, the protein content may range from about 32 to about 49 wt %, about 34 to about 48 wt %, about 36 to about 47 wt %, about 38 to about 46 wt %, about 40 to about 46 wt %, about 42 to about 46 wt %, or about 44 to about 46 wt % of the aquatic feed on an as-is basis.

Starch sources in the aquatic feed may include grains. Some non-exhaustive examples of suitable grain sources include corn such as ground corn. Starch may account for about 5 to about 35 wt %, or about 15 to about 20 wt % by dry weight of the aquatic feed on an as-is basis. In particular examples, the starch content may range from about 5 to about 35 wt %, about 10 to about 30 wt %, about 12 to about 27 wt %, about 15 to about 25 wt %, about 18 to about 22 wt %, about 19 to about 21 wt %, or about 13 to about 17 wt %, or about 14 to about 16 wt % by dry weight of the aquatic feed on an as-is basis. Sufficient starch content, e.g., at least about 10 wt %, about 15 wt %, or about 20 wt % on an as-is basis, may enable the production of cohesive feed particles due to the starch serving as a binder, thus holding the feed particles together upon their extrusion.

Fiber sources in the aquatic feed may include grain byproducts such as wheat middlings, corn. Fiber may account for about 1 to about 5 wt %, about 2 to about 4 wt %, or about 3 wt % of the aquatic feed on an as-is basis.

Vitamins and minerals may also be included in the aquatic feed. For instance vitamin sources may include riboflavin, biotin, copeningcalciferol, vitamin A, B 6, B 12, D, E, K, ascorbic acid, pyridoxine, thiamin mononitrate, cyanocobalmin, and choline chloride. Mineral sources may include sodium, phosphorous, magnesium, potassium, calcium, zinc, iron, copper, iodine, manganese, and any combination of any of these. Vitamins and minerals may account for about 0.1 to about 3 wt % of the aquatic feed on an as-is basis. In particular embodiments, the vitamin and mineral content may range from about 0.5 to about 2.5 wt %, about 1.0 to about 2.0 wt %, about 1.2 to about 1.8 wt %, or about 1.4 to about 1.6 wt % of the aquatic feed on an as-is basis.

The aquatic feed product may have a moisture content of about 8 to about 13 wt % of the aquatic feed on an as-is basis. While the feed products herein have been described in terms of aquatic feed products, the feed products may be tailored for other animals, such as livestock animals or other animals where a feed product of two different densities is desired.

Figure 1:
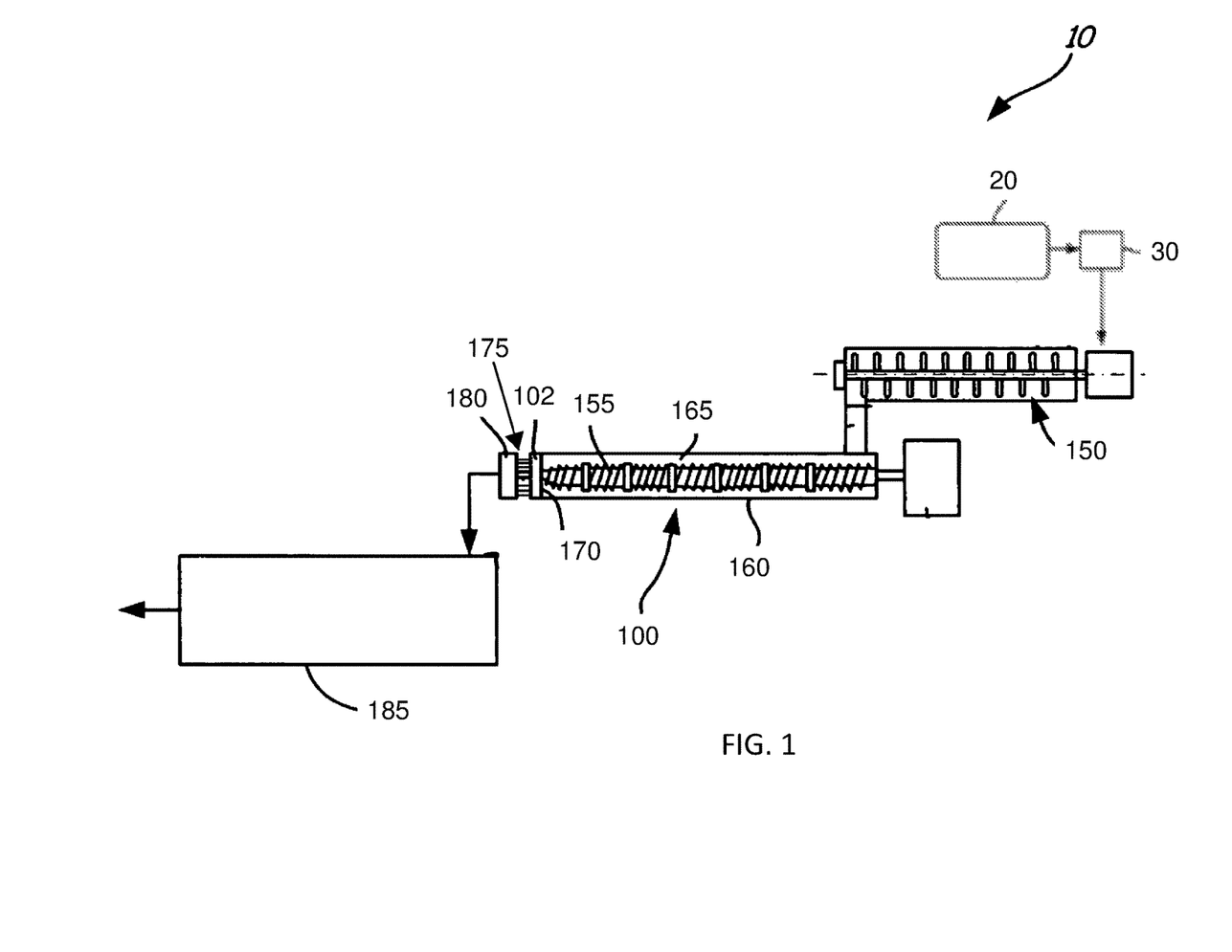
FIG. 1 is a schematic illustration of an extrusion process for producing aquatic feed products according to certain embodiments.

Methods of producing animal feeds having different particle densities:

Animal feeds of the present disclosure may be produced according to a method 10 involves the use of a single extruder 100 having an extrusion die 102 configured to extrude particles having different particle densities. Prior to extrusion, all feed components, except for the oil/fat, may be blended in a dry mixer 20 to form a homogeneous feed mixture. Oil may be added after extrusion, e.g., after drying and/or cooling, to avoid lubricating the interior of the extruder. In some implementations, homogenization may be facilitated by providing a particulated mixture. The particulated mixture may be formed, for instance, by grinding the feed mixture in a grinder 30, such as a Hammermill grinder to form a ground mixture having a particle size that is less than about ⅛ inch or less than about 1/16 inch in size. In some examples, feed mixture particles may be passed through a Hammermill screen having passage openings of about 3/64 to about 4/64 inches in diameter. This mixture may be fed to the extruder 100, for instance through a conditioner 150 of the extruder. Water may be added to the mixture at the mixer 20, at the extruder 100 (e.g., conditioner 150) or both. The extruder 100 may operate at a temperature of above 212° F. (100° C.), for example ranging from about 250° F. to about 275° F. in some embodiments, and this temperature in combination with the pressure caused by the action of the rotating screw 155 on the mixture and the friction between the flowing mixture and the component parts of the extruder 100 result in a pressure within the extruder typically ranging from about 50 to about 300 psi, or about 150 to about 300 psi. The mixture is mechanically worked by the rotating screw 155 within a bore 165 until it eventually flows in a generally fluid manner. For instance, the action of the rotating screw 155 and extruder conditions (e.g. temperature and pressure) maintain the mass in a homogeneous, free-flowing state. During mechanical working and optionally conditioning, the feed composition, such as one or more of the protein, fat, fiber and starch, may serve to bind the feed components. In some particular implementations, the starch serves to bind the feed components.

Steam may be added to the extruder 100 (at both the conditioner 150 and barrel 160) to increase the temperature of the feed components and the mixture, typically to or in excess of about 212° F. (100° C.) and/or to raise the moisture content of the feed components and/or the mixture. The amount of heat and steam applied may be controlled by valving techniques to obtain temperatures which are sufficiently high to cause the desired chemical and physical reactions within the feed components and/or the mixture. The amount of heat and steam added may vary and a moisture content of the feed mixture prior to extrusion may be range from about 20 to about 30 wt % or about 23 to about 27 wt % of the mixture.

After the feed mixture has been sufficiently blended and cooked, it is forced from the extruder by the rotating screw 155 or screws through an extruder die 102 at the outlet 170 configured to simultaneously extrude the feed mixture into ribbons 175 at two or more different densities according to the present disclosure. Upon extrusion, the ribbons may contain about 20 to about 30 wt % moisture. Since the mixture emerges from an environment of high temperature and pressure into an environment of lower temperature and pressure (typically ambient or room temperature and pressure), the mixture expands upon leaving the extruder. Further, the nutrients, such as starch, distributed throughout the ribbon serves to bind the expanding feed composition once the feed composition exits the extruder. However, due to the length of the land of the extruder die openings being longer than the diameter of the die openings, as described herein, the longer land length results in compressing of the feed mixture for a relatively longer distance and time compared to the extrusion die openings having about the same land length as the die opening. Due at least in part to this longer compression length through the die openings having the longer land, the extrusions have a higher bulk density compared to the extrusions through the other die openings with a shorter land. While the ribbons of at least two different densities expand upon exiting the extruder, and the feed mixture in each ribbon is bound together by the binding action of the nutrient(s), the degree of expansion for the more dense ribbons is lower compared to the degree of expansion of the less dense ribbons. For instance, for two ribbons exiting a die opening having the same diameter but a different land length, the ribbon exiting the die opening with the longer land length will expand to a lesser degree compared to the ribbon exiting the same sized die opening having the shorter land length, thus resulting in ribbons having different sizes, i.e., diameter.

As extrusions of different densities simultaneously exit the extruder, they are cut into particles of these different densities by cutting blades 180. Consequently, because the ribbons of different densities have different sizes, the size of the resulting pellets differs. Further, depending on the number of cutting blades and the rate of rotation of the blades, the number of pellets produced for a given time varies. For instance, the number of cutting blades may vary, ranging from 1 to 20 blades with a rotation rate of up 7000 RMP in various examples.

The extruded particles may be transferred for drying using an air conveyor between the extruder 100 and the dryer 185 or a mechanical conveyor like a belt conveyor. The dryer 185 may apply drying temperatures of about 220° F. to about 275° F., or in some examples, up to about 600° F. Upon drying, the particles may have a moisture content of about 8 to 11 wt %.

After drying, oil may be added to the extruded particles. In some embodiments, the oil may be added after cooling the particles to an approximately ambient temperature. Methods of oil addition may vary in different embodiments. For example, the oil may be sprayed onto the extruded feed particles.

It is to be understood that the term "extruder" is not meant to encompass "pellet mills" that are used to form pellets by compressing ingredients together.

Figure 2A:
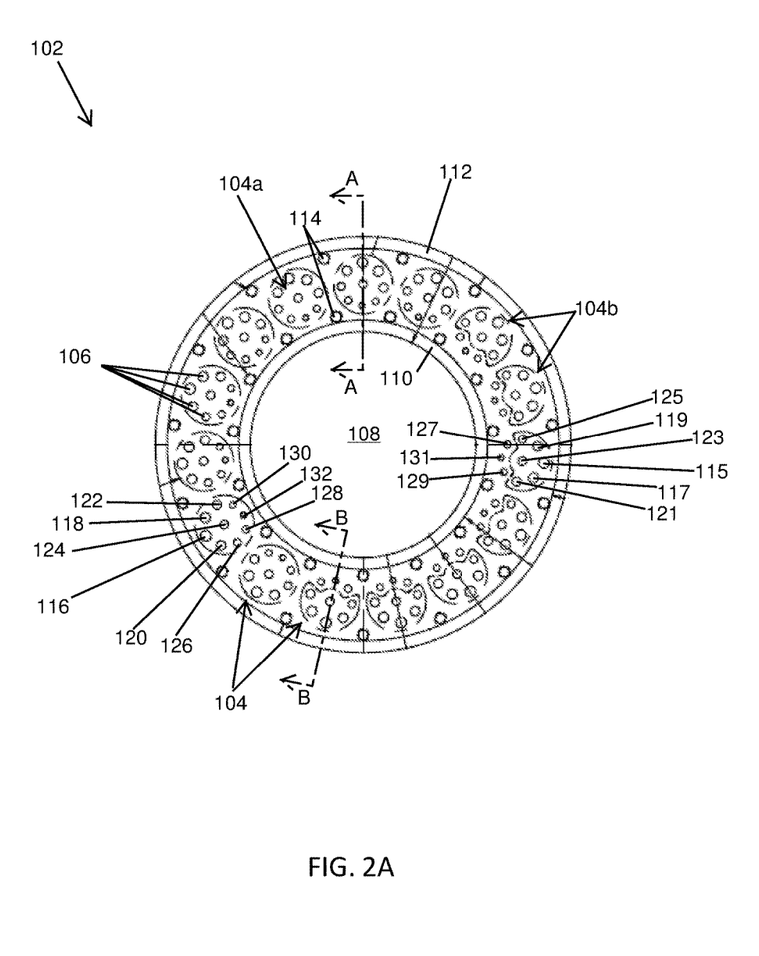
FIG. 2A is a schematic illustration of a rear view of an extruder die according to certain embodiments.

FIG. 2A illustrates a rear view of the extruder die 102. The extruder die 102 may be joined to the extruder 100 at the outlet 170, thereby providing openings through which the feed mixture can be forced for the simultaneous production of feed particles having different densities. As shown, the extruder die 102 may define a plurality of extrusion pocket regions 104, each pocket region defining a plurality of die openings 106 through which the feed mixture may pass as it exits the extruder barrel 160. In this embodiment, two different extrusion pocket region configurations are depicted: a rounded extrusion pocket region 104*a* and an irregular extrusion pocket region 104*b*. Each rounded extrusion pocket region 104*a* includes nine die openings: a first opening 116, a second opening 118, a third opening 120, a fourth opening 122, a centrally-disposed fifth opening 124, a sixth opening 126, a seventh opening 128, an eighth opening 130, and a ninth opening 132. Each irregular extrusion pocket region 104*b* also defines nine die openings: a first opening 115, a second opening 117, a third opening 119, a fourth opening 121, a centrally-disposed fifth opening 123, a sixth opening 125, a seventh opening 127, an eighth opening 129, and a ninth opening 131. The extruder die 102 shown in FIG. 2A is ring-shaped, defining a centrally-disposed mounting aperture 108. The extruder die 102 may include an extruder die plate 103 (cross-sectional portions of which are shown in FIGS. 2C and 2D) affixed thereto. In other embodiments, the various extrusion features included in the extruder die 102, e.g., the pocket regions 104, may be integrally formed within the extruder die 102. The extruder die 102 includes an inner circumferential portion 110 and an outer circumferential portion 112. A plurality of fasteners 114, e.g., bolts, studs, screws or pins, extend through the cross-sectional width of the extruder die plate 103, collectively fastening the die plate to the extruder die 102 and the end of the extruder barrel 160.

In operation, the feed mixture is forced from the extruder barrel 160 through the plurality of die openings 106 defined by the extruder die 102. Because the openings 106 may have different diameters and/or land lengths, the ribbons 175 of the feed mixture emerging therefrom may have different cross-sectional dimensions and/or densities.

In some examples, the extrusion pocket regions 104 may be machined into the extruder die 102 (or extruder die plate 103, specifically). In other examples, the extrusion pocket regions 104 may be separate, insertable components configured to be received by complementary receiving spaces defined by the extruder die 102 (or die plate 103).

The total number of extrusion pocket regions 104 may vary, as well as the relative number of rounded extrusion pocket regions 104*a* to irregular extrusion pocket regions 104*b*. The extruder die 102 illustrated in FIG. 2A, for example, includes 15 total extrusion pocket regions 104, comprised of eight rounded extrusion pocket regions 104*a* and seven irregular extrusion pocket regions 104*b*. The configuration of the extrusion pocket regions 104, i.e., rounded or irregular, may depend on the land length of the die openings 106 defined by each pocket region 104. In particular, the depth of portions of the extrusion pocket regions 104 may be less than or equal to the cross-sectional width of the extruder die plate 103 depending on the land length(s) of one or more die openings 106 defined by each pocket region 104. The land length represents the length of the die opening, measured perpendicularly with respect to the diameter. For instance, die openings having land lengths equal to the cross-sectional width of the extrusion die plate 103, e.g., the seventh, eighth, and ninth die openings 127, 129, 131 of each irregular extrusion pocket region 104*b*, extend completely through the die, and may thus not appear depressed relative to the flat, vertical, rear surface plane of the extruder die plate 103. As provided herein, such die openings (127, 129, 131) each have a land that is longer than the die opening. This is because the entrance of such die openings are flush with the surface of the extruder die plate 103, and the die plate thickness is longer than any diameter of the die openings 106. By contrast, to accommodate die openings having land lengths less than the cross-sectional width of the extruder die plate 103, e.g., to form land lengths that are equal to or smaller than the die opening diameter, the die plate may be narrowed (i.e., shortened) within the extrusion pocket region that includes such openings. Consequently, the entrance to die openings 106 having land lengths less than the cross-sectional width of the extruder die plate 103 are not flush with the flat, vertical surface plane of the extruder die plate 103. In FIG. 2A, extrusion pocket regions containing one or more die openings having land lengths equal to the cross-sectional width of the extruder die plate 103 do not appear rounded from a front view, provided that such pocket regions define a mixture of openings having land lengths equal to and less than the cross-sectional depth of the extruder die plate.

The dimensions of each extrusion pocket region 104 may vary. As shown in FIG. 2A, each rounded extrusion pocket region 104a has a diameter of approximately 1.25 inches. In embodiments, the pocket diameter may range from about 0.50 inches to about 2.5 inches. The diameter of the extrusion pocket regions 104 may vary to accommodate differently sized extruder dies. For example, the extruder die shown in FIG. 2A has an external diameter of about 8.75 inches. Extruder dies in other examples may range in diameter from about 4 to about 12 inches. The mounting aperture has a diameter of about 4.75 inches. The diameter of the mounting aperture 108 may also vary, ranging from about 2 to about 10 inches in various embodiments. In some examples, the distance between the lateral midpoint between the inner circumferential portion 110 and outer circumferential portion 112 on one side of the extruder die and the corresponding midpoint on the opposite side of the die may be about 6.75 inches. This distance may vary in embodiments, ranging from about 4 to about 10 inches. The die plate or working portion of the extruder die where the feed mixture is received may have a radius of about 1.12 inches, or may have a variable radius ranging from about 0.5 to about 2.5 inches depending on the configuration of the extruder, e.g., the barrel. Although the extruder die 102 is depicted as a circular die, it may have a different shape, such as a block-shape.

The size of the feed particles, and whether they are adapted to sink or float, is a result of the die opening configuration from which the feed particles are extruded according to the extrusion processes described herein. In particular, the size of the extruded feed particles may be greater than the size of the die opening 106 from which the particles were extruded due to expansion of the particles that occurs after the feed particles exit the high-pressure conditions within the extruder. The expansion may result from the rapid conversion of water, entrapped within individual feed particles, into steam that may occur when the feed transitions from high pressure conditions within the extruder to low pressure conditions upon exiting the extruder. Because the feed particle matrix may be held together by the cohesive property of the starch within the feed particles, the steam may not escape from within the feed particles, thereby forming air pocket regions within each extruded feed particle. The volume of the air pocket regions, specifically, may increase the volume of the extruded feed particles. The level of expansion may vary in different feed particles depending on the configuration of the die openings through which the feed particles pass upon extrusion. In particular, each die opening may be defined by a diameter and a land length. There may be an inverse relationship between the land lengths of the die openings (and thus the feed mixture dwell time in the die openings) and the level of expansion that occurs to feed particles extruded from such die openings. Specifically, the level of extruded feed particle expansion may decrease with increased land lengths of the die openings and feed mixture dwell times therein. The increased feed mixture dwell times within the die openings may be the combined result of the greater distance traversed by the feed mixture in die openings and the frictional force exerted on the feed mixture as it passes therethrough. In some examples, the frictional force between the interior of the die opening and the feed mixture may increase dwell time by an amount greater than the proportional increase in land length. For example, feed passing through a first die opening having a land length twice as long as a second die opening may, due in part to friction, experience a dwell time of about three times greater than identically formulated feed passing through the second die opening. Less expansion of such feed particles may cause the particles to have greater densities, in some cases causing such feed particles to sink when added to water. In some examples, expansion may cause the extruded feed particles to have a diameter approximately 50% greater than the diameter of the die opening from which such particles emerged. For instance, expansion may cause a feed particle to have a diameter of about 0.3 inches despite being extruded from a die opening defined by a 0.2-inch diameter.

The total number of die openings 106, and the proportion and arrangement of die openings producing floating and sinking feed particles, may vary. The extruder die 102 shown in FIG. 2A includes 135 total die openings. Of the total, feed particles adapted to sink may emerge only from die openings 127, 129 and 131 of each irregular extrusion pocket region 104b. Because there are seven irregular extrusion pocket regions 104b, each having three die openings 127, 129, 131 configured to extrude sinking feed particles, 21 out of the 135 die openings shown (about 15.5%) are configured to extrude feed particles having densities sufficient to cause the particles to sink. The rest of the die openings may extrude floating feed particles. Accordingly, about 15.5%, by count, of the feed particles extruded from the extruder die 102 may have densities sufficient to cause the particles to sink. By weight, the proportion of sinking feed particles relative to floating feed particles may be lower than 15.5%, ranging from 0.5 wt % to about 15 wt % in various examples. In embodiments, the proportion of die openings configured to extrude sinking feed particles may vary, ranging from about 5 to about 95% of the total number of die openings.

The number of distinctly dimensioned die openings 106 may also vary. As shown, each extrusion pocket region 104 defines nine die openings, each die opening having a different diameter. Because the land lengths may also vary between the die openings 106 in the irregular extrusion pocket regions 104b and the rounded extrusion pocket regions 104a, the extruder die 102 of FIG. 2A defines 12 distinctly-dimensioned die openings. In particular, six of the die openings included in each irregular extrusion pocket region 104b have the same dimensions, i.e., diameter and land length, as six corresponding openings in each rounded extrusion pocket region 104a. However, the three die openings 127, 129, 131 of each irregular extrusion pocket region 104b having land lengths equal to the cross-sectional width of the extruder die plate 103 have longer land lengths (e.g., two to three times longer than its respective die opening diameter) than the three similarly-positioned die openings 128, 130, 132 defined by each rounded extrusion pocket region 104a.

As further shown in FIG. 2A, the arrangement of die openings 106 within each extrusion pocket region 104 may be consistent with respect to the outer perimeter of the extruder die 102. For example, in each of the irregular extrusion pocket regions 104b, the seventh, eighth, and ninth die openings 127, 129, 131 are each positioned nearest the inner circumferential portion 110. In some examples, the die opening arrangement within each extrusion pocket region 104 may vary. In some embodiments, each equally-dimensioned die opening may be positioned in the same position with respect to the orientation of the extruder die 102, such that the openings having the largest diameter in each extrusion pocket region 104 are positioned at the upper most portion of each pocket, thus not necessarily closest to the outer circumferential portion 112 of the extruder die, as depicted in FIG. 2A.

In other embodiments, the arrangement of various die openings 106 and extrusion pocket regions 104 may vary. For example, die openings configured to extrude feed particles adapted to sink may be clustered within the same extrusion pocket regions, such that each extrusion pocket region produces particles either adapted to sink or adapted to float. Such extrusion pocket regions may also be arranged adjacent to each other, or interspersed through the extruder die. In contrast, by distributing the die openings configured to produce sinking feed particles across multiple extrusion pocket regions, as in FIG. 2A, the likelihood that clogging one or more extrusion pocket regions will completely eliminate the formation of sinking feed particles is reduced. Thus, including a plurality of differently-dimensioned die openings in each extrusion pocket may reduce the impact of extrusion pocket clogging on the overall proportion of feed particles adapted to float relative to feed particles adapted to sink.

Figure 2B:
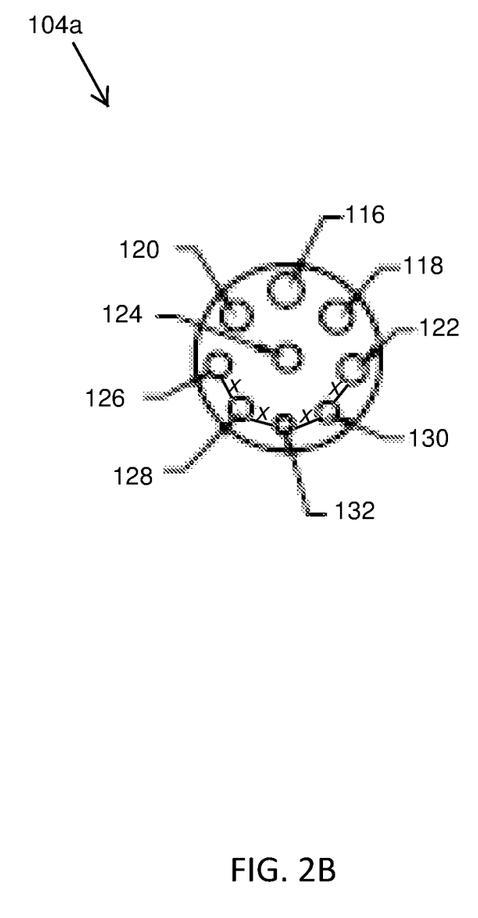
FIG. 2B is a schematic illustration of a die pocket region defined by the extruder die shown in FIG. 2A according to certain embodiments.
Figure 2C:
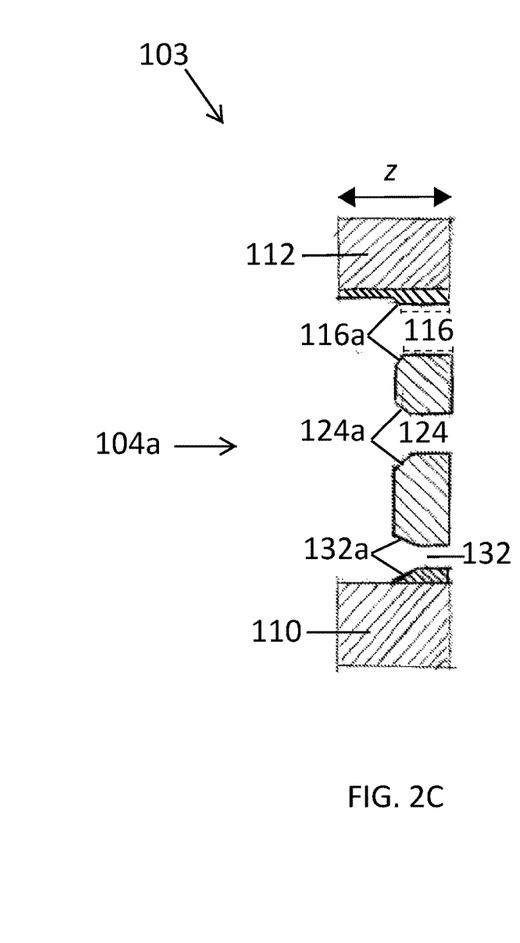
FIG. 2C is a schematic illustration of a cross-sectional side view of an extruder die plate, taken along line A-A of the extruder die shown in FIG. 2A according to certain embodiments.
Figure 2D:
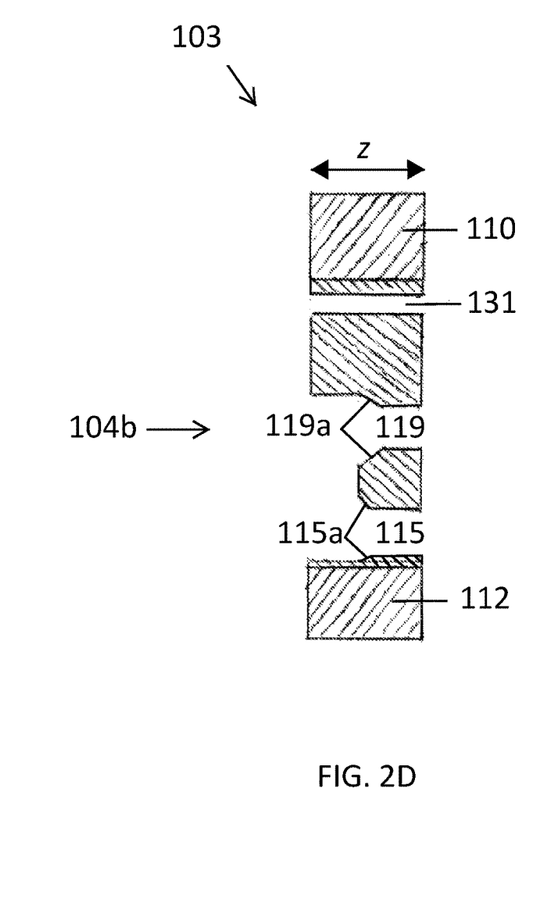
FIG. 2D is a schematic illustration of another cross-sectional side view of the extruder die plate, taken along line B-B of the extruder die shown in FIG. 2A according to certain embodiments.

FIG. 2B illustrates a magnified view of a rounded extrusion pocket region 104a. Each die opening 106 depicted in the rounded extrusion pocket region 104a of FIG. 2B has a land length that is shorter than the cross-sectional width of the extruder die plate 103 and equal to the cross-sectional width of each opening. The rounded pocket region 104a defines nine die openings 106: the first opening 116, the second opening 118, the third opening 120, the fourth opening 122, the centrally-disposed fifth opening 124, the sixth opening 126, the seventh opening 128, the eighth opening 130, and the ninth opening 132. Each of the die openings 106 shown in the rounded pocket region 104a of FIG. 2B defines a different diameter. In embodiments, the number of openings having the same or different diameter may vary. For example, while each die opening 106 shown in FIG. 2B defines a different diameter, other extrusion pocket regions may include two or more openings of equal diameter. In some examples, the plurality of openings 106 included in a given extrusion pocket may collectively define only two distinct diameters, e.g., a small diameter and a large diameter. Alternatively, each of the openings 106 may have the same diameter. Consequently, in a pocket region may be free of openings of differing diameters. In some examples, the land length of each die opening may be equal to each of the other the land lengths of other die openings. In such examples, the diameter of the openings 106 may be equal or different from each other. Returning to FIG. 2B, the first opening 116 has a diameter of about 0.218 inches, the second opening 118 has a diameter of about 0.207 inches, the third opening 120 has a diameter of about 0.196 inches, the fourth opening 122 has a diameter of about 0.185 inches, the fifth opening 124 has a diameter of about 0.174 inches, the sixth opening 126 has a diameter of about 0.163 inches, the seventh opening 128 has a diameter of about 0.152 inches, the eighth opening 130 has a diameter of about 0.141 inches, and the ninth opening 132 has a diameter of about 0.130 inches. In embodiments, the diameter of one or more openings may vary, ranging from about 0.05 to about 0.5 inches. The incremental difference in die opening diameter between each successively-sized die opening depicted in FIG. 2B is about 0.011 inches. In embodiments, the stepwise difference in die opening diameters may be selected by identifying the largest desired feed particle diameter and the smallest desired feed particle diameter, and equally spacing the die opening diameters within the range between the largest and the smallest diameter. In other examples, unequal proportions of small and large diameter feed particles may be desired. In such cases, more die openings may have a diameter nearer the largest-desired particle diameter or the smallest-desired particle diameter.

Each of the die openings depicted in FIG. 2B may also define a distinct land length. In some examples, each die opening may define a land length equal to or less than the diameter of the opening. Feed particles extruded from such die openings may have a density that allows such particles to float. The first die opening 116 having a diameter of 0.218 inches may thus have a land length that is approximately 0.218 inches or shorter. The second die opening 118 having a diameter of 0.207 inches may have a land length of about 0.207 inches or shorter, and so on for the third through ninth openings 120-132. In embodiments, the land lengths of one or more die openings 106 may vary, ranging from about 0.05 to about 0.5 inches. In various examples, one or more die openings may define a land length that is equal to or less than the diameter of the die opening. In some examples, the land lengths of each die opening may be equal to each other, all configured to produce feed particles adapted to float.

By contrast, die openings having land lengths that are greater than the opening diameter may produce sinking feed particles. In some examples, the land length of one or more die openings 106 may be at least twice as long as the diameter of the die opening. In some examples, the land length is at least three times as long as the diameter of the die opening. The die openings 127, 129, 131 of the irregular extrusion pocket regions 104b, for example, each have a land length of approximately 0.3 inches to about 0.6 inches, or a land length of approximately 0.5 inches, despite having diameters equal to the diameters of the similarly-positioned openings in each rounded extrusion pocket. Table 1 provides exemplary die opening diameters and land lengths.

TABLE 1

| Irregular Pocket (in.) | | Rounded Pocket (in.) | |
|---|---|---|---|
| Diam. | Land | Diam. | Land |
| .218 | .218 | .218 | .218 |
| .207 | .207 | .207 | .207 |
| .196 | .196 | .196 | .196 |
| .185 | .185 | .185 | .185 |
| .174 | .174 | .174 | .174 |
| .163 | .163 | .163 | .163 |
| .152 | .500 | .152 | .152 |
| .141 | .500 | .141 | .141 |
| .130 | .500 | .130 | .130 |

The distribution and spacing of the die openings 106 within an extrusion pocket region 104 may also vary. In the embodiment shown, the die openings 106 included in the rounded pocket regions 104a and irregular pocket regions 104b are equidistant from each other, as measured from the outermost edge of each adjacent opening 106. This opening separation distance (x) in FIG. 2B, may be sufficient to allow the nascent feed mixture to expand without recombining and sticking after emergence from the extruder die 102, especially before being cut by the cutting blades 180. For example, the length of the opening separation distance x may vary in different embodiments. In some examples, the opening separation distance x may be greater between or adjacent to die openings 106 having larger diameters and/or short land lengths. Ribbons of feed emerging from such openings may be less dense and/or heavier, thus increasing their propensity to sag into the pathway of adjacently-emerging ribbons of feed before being cut. As shown, the opening separation distance x is about 0.169 inches. In embodiments, the opening separation distance x may vary, ranging from about 0.04 to about 0.50 inches, about 0.06 to about 0.45 inches, about 0.08 to about 0.40 inches, about 0.10 to about 0.35 inches, about 0.12 to about 0.30 inches, about 0.14 to about 0.25 inches, about 0.15 to about 0.20 inches, about 0.16 to about 0.18 inches, or about 0.165 to about 0.175 inches.

The arrangement of die openings 106 defined by each extrusion pocket region 104 may also vary. In FIG. 2B, the die openings 106 are arranged in a circle near the perimeter of the rounded extrusion pocket region 104a, with a single die opening 124 in the center. In embodiments, the die openings 106 may be arranged in lines or other arrangements. The number of die openings 106 may also vary. Each of the extrusion pocket regions shown in FIG. 2A includes nine die openings 106, but embodiments may include more or less than nine. The number of die openings 106 present in a single extrusion pocket region 104 may range from one to about 20 in examples.

The arrangement of extrusion pocket regions 104 may also vary. As shown, the extrusion pocket regions 104 are equally sized and equidistant from each other. In particular, the center point of one extrusion pocket is approximately 24° from the center of the adjacent extrusion pocket. In some examples, the angular spacing between adjacent extrusion pocket regions may vary and may depend on the type of extrusion pocket, such that the spacing between rounded extrusion pocket regions 104a and/or irregular extrusion pocket regions 104b are distinct. The arrangement of rounded extrusion pocket regions 104a and irregular extrusion pocket regions 104b may also vary. In FIG. 2A, the rounded pocket regions 104a clustered in one group and the irregular pocket regions 104b are clustered in another group. Alternative embodiments may include interspersed rounded pocket regions 104a and irregular pocket regions 104b.

FIG. 2C illustrates a cross-section of a portion of the extruder die plate 103 taken along cross-sectional plane A-A depicted in FIG. 2A. FIG. 2C illustrates a rounded extrusion pocket region 104a, including die openings 116, 124, and 132. FIG. 2C also shows the inner 110 and outer 112 circumferential portions of the die. In this particular embodiment, the cross-sectional width (z) of the die plate is about 0.500 inches. In other embodiments, the cross-sectional width may vary. The inner 110 and outer 112 circumferential portions may define chamfered surfaces in some examples.

As further shown in FIG. 2C, each die opening may be defined by a diameter equal to its land length. Die opening 116, for instance, has a diameter of about 0.218 inches in this embodiment, and a land length of about 0.218 inches. Die opening 124 has a diameter and land length of about 0.174 inches each, and die opening 132 has a diameter and land length of about 0.130 inches each. The equally-sized diameters and land lengths may extrude feed particles adapted to float. Each die opening defined by the rounded pocket region 104a may also define beveled surfaces, which are not included in the land length of each opening. The land length of each die opening is measured only by the length of the parallel, opposing surfaces defined by each die opening, indicated by the dashed lines in die opening 116. Beveled surfaces 116a, 124a, and 132a are defined by die openings 116, 124 and 132, respectively. Such beveled surfaces may facilitate the passage of feed mixture through the die openings by reducing the clogging and/or backup that may result if the feed mixture was not funneled into each die opening.

FIG. 2D illustrates a cross-section of a portion of the extruder die plate 103 taken along cross-sectional plane B-B of FIG. 2A. This cross-sectional view depicts an irregular extrusion pocket region 104b, which includes die openings 131, 119, and 115. As shown, die opening 131 has a land length equal to the cross-sectional width of the die plate 103, thus equal to 0.500 inches in this embodiment. As such, die opening 131 may not define beveled surfaces. In this example, the diameter of die opening 131 is about 0.130 inches. Even though the diameter of die opening 131 is equal to the diameter of die opening 132, the longer land length of die opening 131 increases the dwell time of feed mixture passing therethrough, both due to the longer distance that such feed mixture needs to travel, and the increased friction exerted by the extended inner walls of the die opening. As a result, die opening 131 may extrude feed particles having increased densities, thus causing them to sink when placed in water. By contrast, die openings 119 and 115 are similar to die openings 124 and 116, respectively, and are therefore configured to extrude feed particles adapted to float. Die opening 119 includes beveled surfaces 119a, and die opening 115 also defines beveled surfaces 115a. Die openings 119 and 115 also each define a diameter and land length of equal size. In particular, the diameter and land length of die opening 119 area each about 0.174 inches, and the diameter and land length of die opening 115 are each about 0.218 inches.

The extrusion pocket regions 104a, 104b depicted in FIGS. 2C and 2D may be formed as inserts in some examples. As such, the inserts may be formed from a different material than that comprising the extruder die 102, and thus the inner and outer circumferential portions 110 and 112. Extrusion pocket regions machined into the extruder die, by contrast, may be formed of the same material as the rest of the extruder die.

The components of the extruder apparatus described herein may be manufactured according to various casting and machining processes. Welding, stamping and/or bending methods as well as machining (e.g. drilling, shaving, grinding material from the die) may be used to define various edges, openings or surfaces.

While this invention has been described with reference to exemplary embodiments, it will be understood by those skilled in the art that various changes can be made and equivalents may be substituted, without departing from the spirit and scope of the invention. In addition, modifications may be made to adapt the teachings of the invention to particular situations and to use other materials, without departing from the essential scope thereof. The invention is thus not limited to the particular examples that are disclosed here, but encompasses all of the embodiments falling within the scope of the claims.

What is claimed is:

1. A method of simultaneously forming feed particles of different densities, comprising:
   extruding a heated feed composition comprising at least about 10 wt % starch through an extruder having an extruder die, the extruder die comprising a plurality of spaced pocket regions, each pocket region defining a plurality of die openings, wherein each of a first plurality of the die openings comprises a land length that is at least two times as long compared to a diameter of a respective die opening, wherein each of a second plurality of the die openings comprises a land length that is equal to or less than a diameter of a respective die opening, wherein extrusion of the heated feed composition through the first plurality of the die openings results in compressing the heated feed composition along a longer land length compared to the heated feed composition in the second plurality of the die openings thereby causing a first plurality of extruded ribbons to exit the extruder die with a first density, and wherein extrusion of the heated feed composition through the second plurality of the die openings results in compressing the heated feed composition along a shorter land length relative to the feed composition in the first plurality of the die openings thereby causing a second plurality of extruded ribbons to exit the extruder die with a second density that is lower than the first density; and cutting the first and second plurality of extruded ribbons to simultaneously form feed particles of the first and second densities.

2. The method of claim 1, wherein the die openings are spaced apart from one another by an equal distance as measured from an outermost edge of the die opening relative to an outermost edge of a next adjacent die opening.

3. The method of claim 1, wherein a diameter of the die openings of at least a portion of the first and second plurality of the die openings are equal to each other, and wherein an extruded ribbon with the first density is narrower relative to an extruded ribbon with the second density such that two different sized pellets are produced from die openings of the same diameter.

4. The method of claim 1, wherein each pocket region defines the same number of die openings as other pocket regions.

5. The method of claim 1, wherein the feed particles have a diameter of about 0.2 in. to about 2.0 in.

6. A method of simultaneously forming feed particles of different densities, comprising:

extruding a heated feed composition through an extruder having a screw within a barrel, the extruder comprising an extruder die defining a plurality of die openings through which the feed composition is extruded simultaneously, wherein a first plurality of the die openings each comprises a land length that is at least two times as long compared to a diameter of a respective die opening, wherein a second plurality of the die openings each comprises a land length that is equal to or less than a diameter of a respective die opening, wherein extrusion of the heated feed composition through the first plurality of the die openings results in compressing the heated feed composition along a longer land length compared to the heated feed composition in the second plurality of the die openings thereby causing a first plurality of extruded ribbons to exit the first plurality of the die openings with a first density, wherein extrusion of the heated feed composition through the second plurality of the die openings results in compressing the heated feed composition along a shorter land length relative to the feed composition in the first plurality of the die openings thereby causing a second plurality of extruded ribbons to exit the second plurality of the die openings with a second density that is lower than the first density; and cutting the first and second plurality of extruded ribbons to simultaneously form feed particles of the first and second densities.

7. The method of claim 6, wherein a diameter of the die openings of at least a portion of the first and second plurality of the die openings are equal to each other.

8. The method of claim 7, wherein the equal diameters are about 0.130 in. to about 0.152 in.

9. The method of claim 8, wherein a land length of the first plurality of openings is about 0.3 in. to about 0.5 in.

10. The method of claim 6, wherein the extruder die comprises a plurality of spaced pocket regions, the plurality of die openings defined by the pocket regions, wherein at least one pocket region defines a portion of the first plurality of the die openings, and wherein at least one pocket region defines a portion of the second plurality of openings and is free of the first plurality of openings.

11. The method of claim 10, wherein the at least one pocket region defining the portion of the first plurality of the die openings is free of the second plurality of openings.

12. The method of claim 10, wherein each pocket region defines the same number of die openings as other pocket regions.

13. The method of claim 10, wherein the die openings are spaced apart from one another by an equal distance as measured from an outermost edge of the die opening relative to an outermost edge of a next adjacent die opening.

14. The method of claim 6, wherein the plurality of extruded ribbons comprises about 20 to about 30 wt % moisture, the method further comprising the step of drying the feed particles to a moisture content of about 8 to about 11 wt %.

15. The method of claim 6, wherein the heated feed composition is a homogenous, particulated mixture.

16. The method of claim 15, wherein the homogenous mixture comprises an aquatic feed composition.

17. The method of claim 15, wherein the homogenous mixture comprises about 20 to about 30 wt % moisture and at least 10 wt % starch.

* * * * *